(12) United States Patent
Schad

(10) Patent No.: US 11,298,859 B2
(45) Date of Patent: Apr. 12, 2022

(54) IN-MOLD ASSEMBLY SYSTEM FOR AN INJECTION MOLDING MACHINE

(71) Applicant: Niigon Machines Ltd., Vaughan (CA)

(72) Inventor: Robert D. Schad, Toronto (CA)

(73) Assignee: Niigon Machines Ltd., Vaughan (CA)

( * ) Notice: Subject to any disclaimer, the term of this patent is extended or adjusted under 35 U.S.C. 154(b) by 571 days.

(21) Appl. No.: 16/373,017

(22) Filed: Apr. 2, 2019

(65) Prior Publication Data
US 2019/0224892 A1 Jul. 25, 2019

Related U.S. Application Data

(63) Continuation of application No. 14/921,619, filed on Oct. 23, 2015, now abandoned, which is a continuation of application No. PCT/CA2014/000369, filed on Apr. 25, 2014.

(60) Provisional application No. 61/816,019, filed on Apr. 25, 2013.

(51) Int. Cl.
| B29C 45/00 | (2006.01) |
| B29C 45/42 | (2006.01) |
| B29C 45/12 | (2006.01) |
| B29C 45/17 | (2006.01) |
| B29C 45/40 | (2006.01) |

(52) U.S. Cl.
CPC .......... *B29C 45/006* (2013.01); *B29C 45/12* (2013.01); *B29C 45/1761* (2013.01); *B29C 45/1769* (2013.01); *B29C 45/4005* (2013.01); *B29C 45/4225* (2013.01)

(58) Field of Classification Search
None
See application file for complete search history.

(56) References Cited

U.S. PATENT DOCUMENTS

| 3,973,888 | A | 8/1976 | Hehl |
| 5,037,597 | A | 8/1991 | McGinley et al. |
| 5,378,422 | A | 1/1995 | Musiel et al. |
| 6,086,808 | A | 6/2000 | Sorensen et al. |
| 8,113,820 | B2 | 2/2012 | Clark |
| 2002/0079619 | A1 | 6/2002 | Herbst |
| 2005/0223677 | A1 | 10/2005 | Py |
| 2012/0076890 | A1 | 3/2012 | Huang |

FOREIGN PATENT DOCUMENTS

| EP | 0568732 A1 | * 11/1993 | .......... B29C 45/006 |
| EP | 568732 | 1/1996 | |
| WO | 9313927 | 7/1993 | |

* cited by examiner

Primary Examiner — Joseph S Del Sole
Assistant Examiner — Manley L Cummins, IV
(74) Attorney, Agent, or Firm — James Raakman; BERESKIN & PARR LLP/ S.E.N.C.R.L., s.r.l.

(57) ABSTRACT

A method for injection molding comprises forming a set of first articles in a mold of an injection molding machine and forming a set of second articles in the mold of the injection molding machine. The method includes transferring the set of first articles from the mold to a first set of first receivers of a tooling plate, and then moving the first set of first receivers to align with the set of second articles. Thereafter the set of second articles is transferred from the mold toward the first set of first receivers and into assembled condition with the set of first articles held in the first set of first receivers.

17 Claims, 18 Drawing Sheets

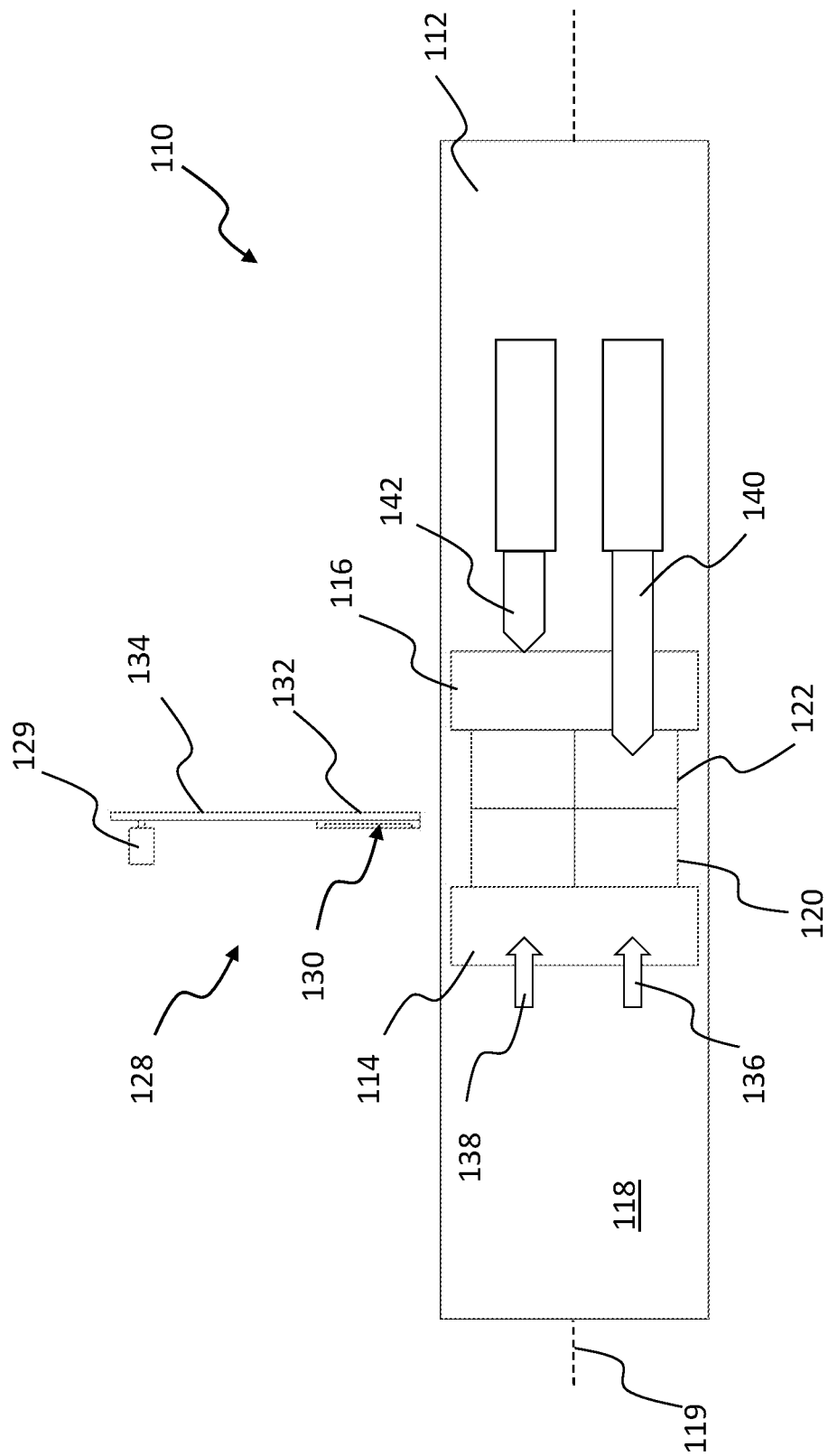

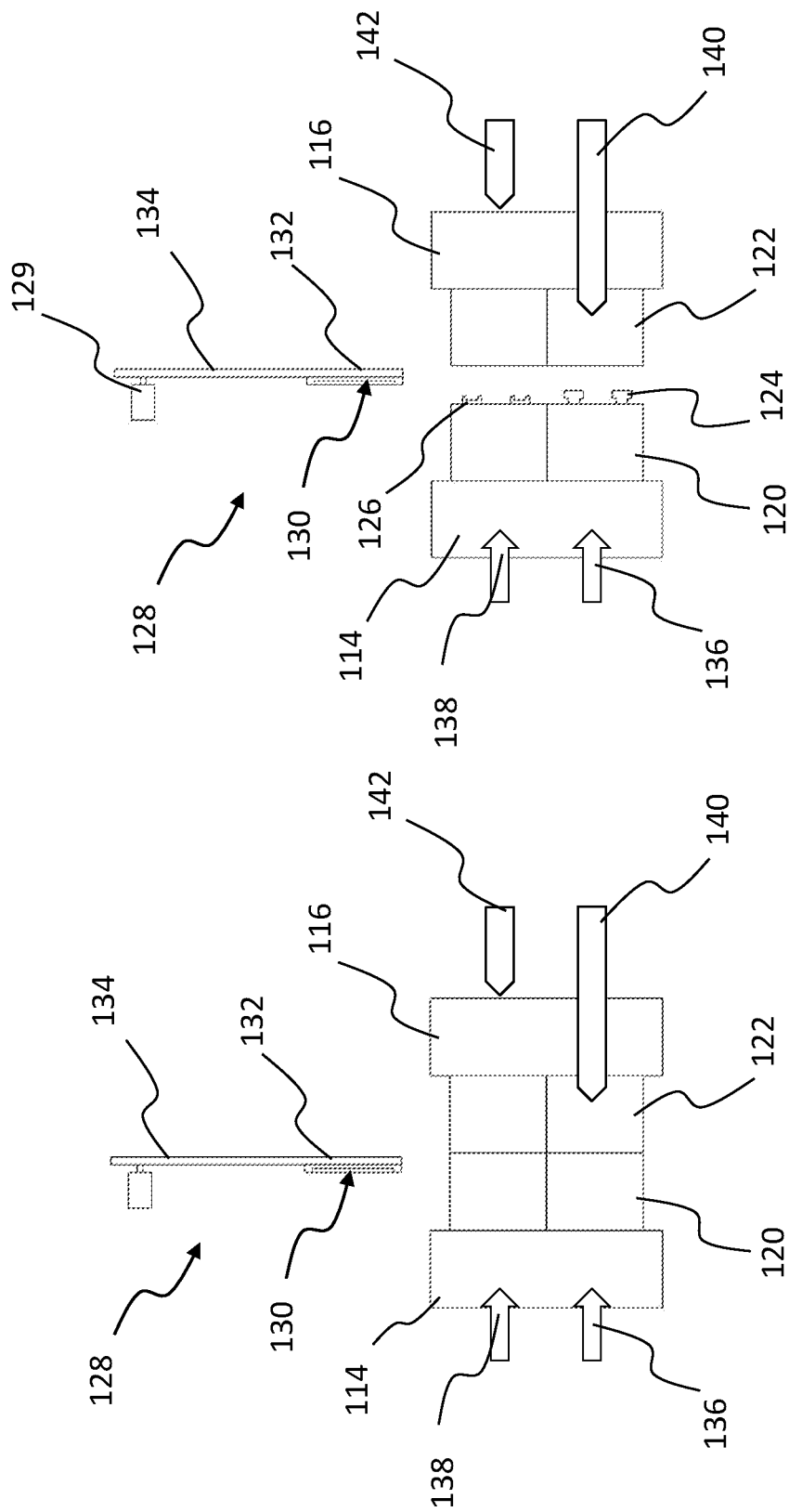

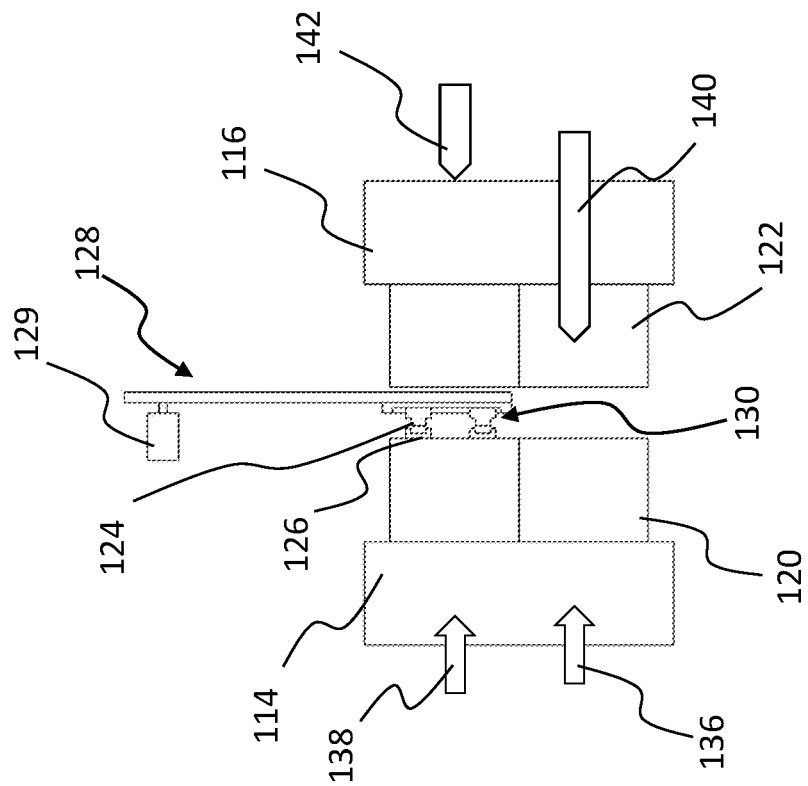
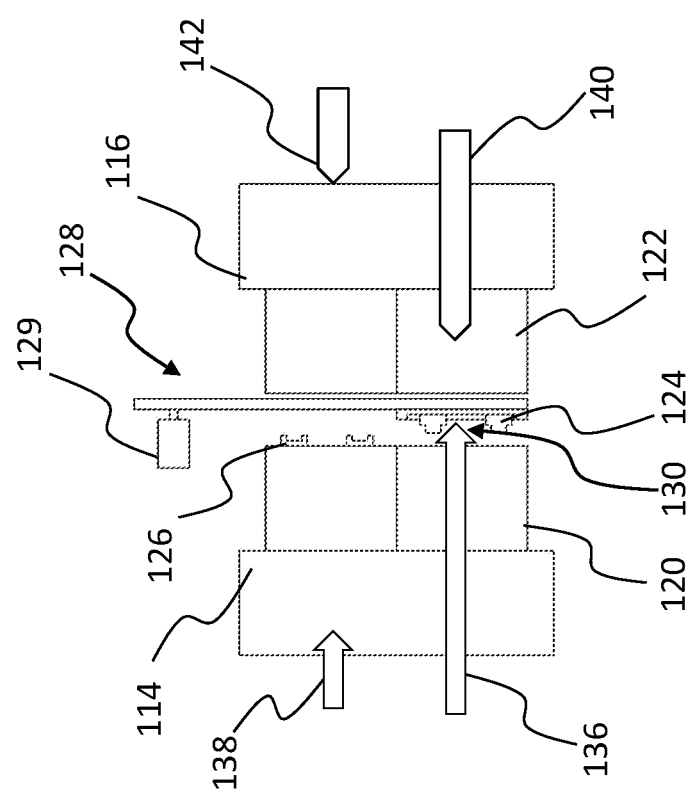

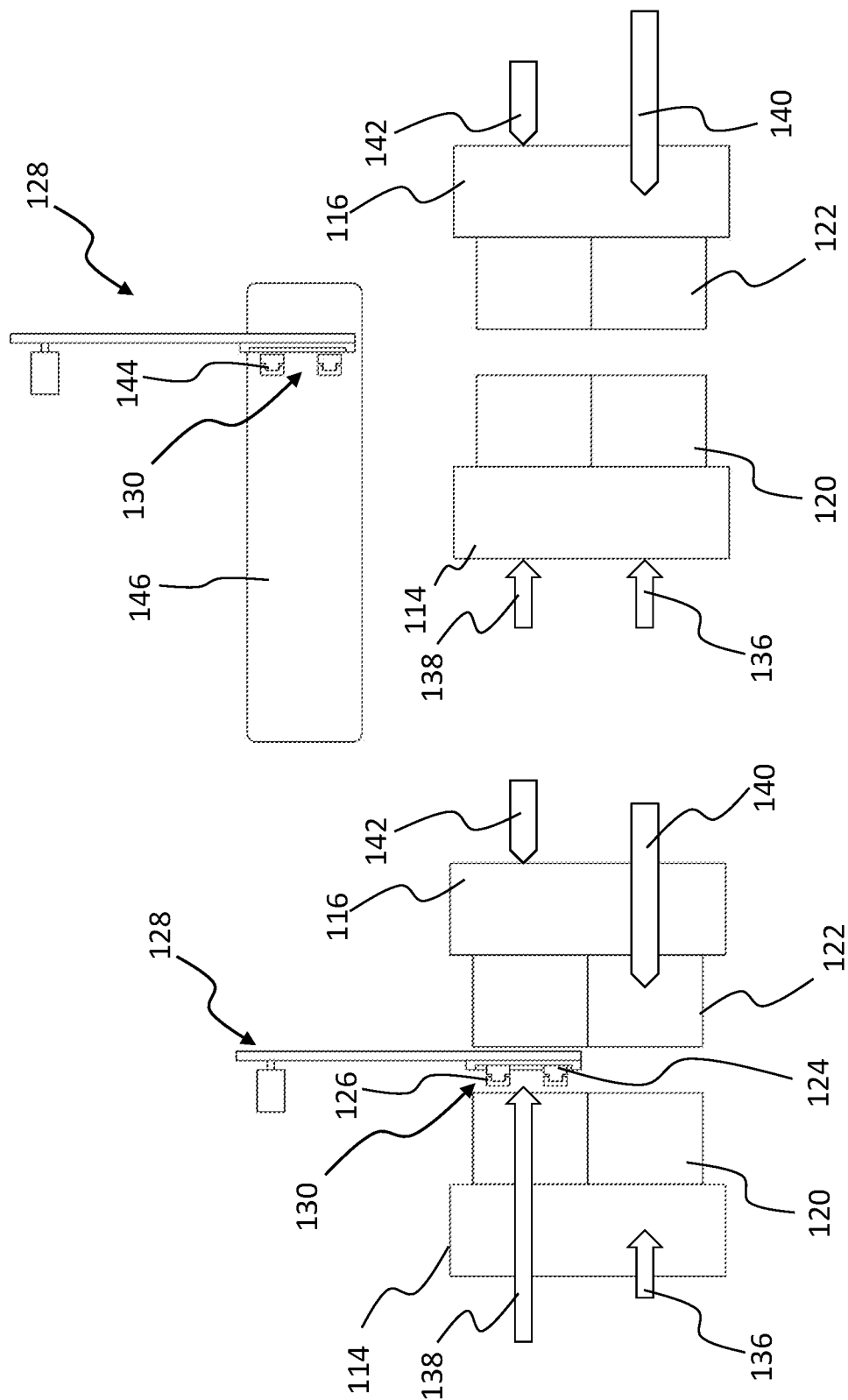

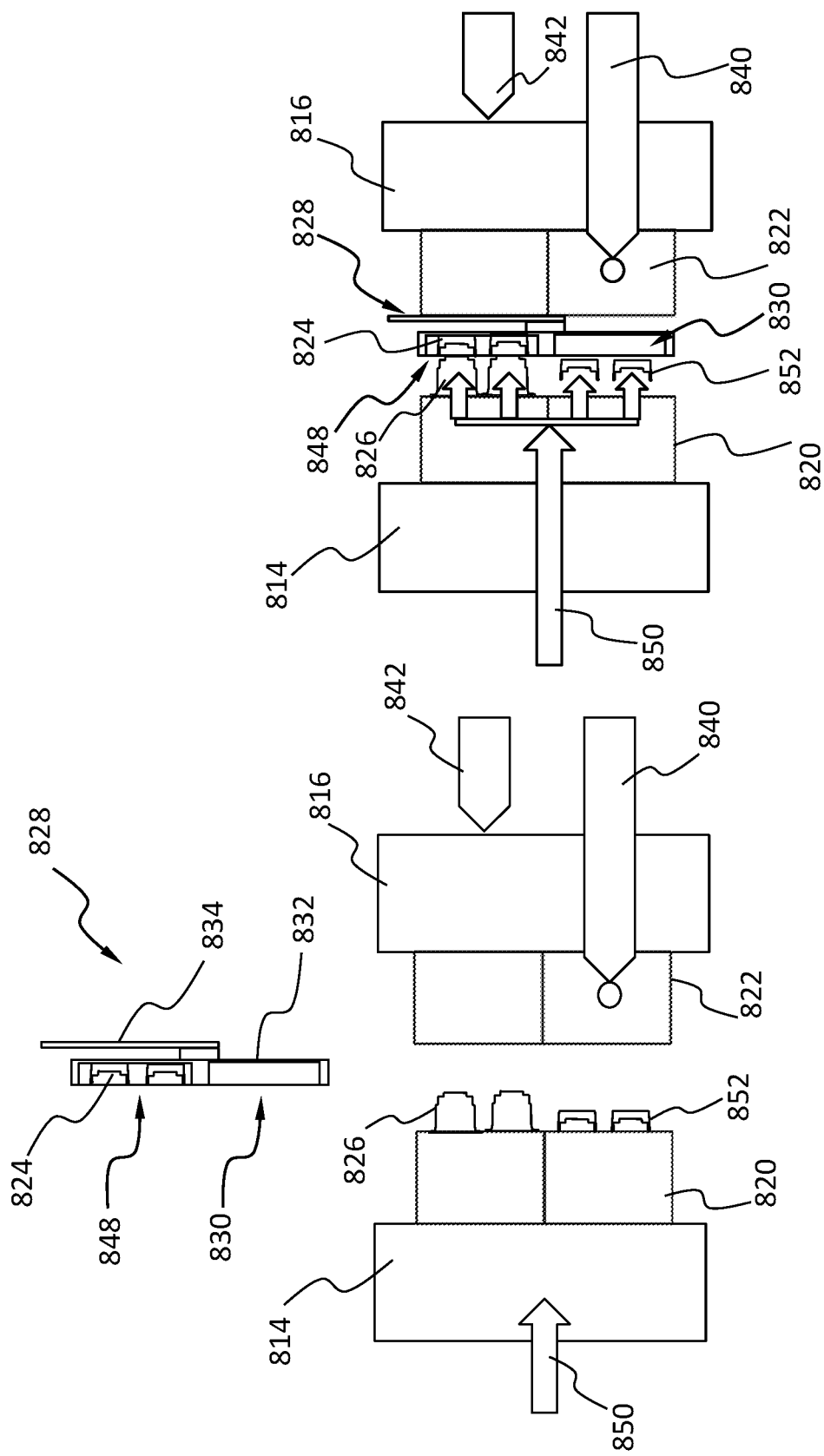

IN-MOLD ASSEMBLY SYSTEM FOR AN INJECTION MOLDING MACHINE

This application is a continuation of U.S. patent application Ser. No. 14/921,619, filed Oct. 23, 2015, which is a continuation of International Application Serial No. PCT/CA2014/000369, filed on Apr. 25, 2014, which claims priority from U.S. Provisional Patent Application Ser. No. 61/816,019, filed on Apr. 25, 2013, each of which is hereby incorporated herein by reference.

FIELD

The disclosure relates to injection molding machines, part handling automation of injection molding machines, and methods and apparatuses for manipulating parts relative to the mold of an injection molding machine.

BACKGROUND

U.S. Pat. No. 8,113,820 (Clark) purports to disclose a method and apparatus for molding and assembling a composition part assembly in, for example, a plastic injection-molding machine. Complementary mold portions associated with a mold plate and a rotatable turret form plural parts. An assembly apparatus associated with the turret assembles the plural parts into an assembly. A further turret may be provided to add a complementary part to the assembly to make a final assembly. The method includes manufacture of composite part assemblies and final assemblies.

U.S. Pat. No. 5,378,422 (Musiel et al.) purports to disclose a molding mechanism and method of using that mechanism for simultaneously forming, by injection molding, two molded parts intended to be interference fit together and then, while the two molded parts are still within the molding mechanism, repositioning them and fitting them together. The sequenced interplay of the moving parts of the molding mechanism which accomplishes this process may be controlled by either a two-part or a single-part camming mechanism. The two molded parts may be an actuator-overcap and a spray nozzle insert.

SUMMARY

The following summary is intended to introduce the reader to various aspects of the applicant's teaching, but not to define any invention.

According to some aspects, an injection molding machine includes a machine base; a first mold support for supporting a first mold half and a second mold support for supporting a second mold half, the mold supports mounted on the machine base, at least one of the mold supports translatable along a machine axis for moving the mold halves between a mold-open and a mold-closed position, the first and second mold halves defining a set of first cavities for forming a set of first articles and a set of second cavities for forming a set of second articles; and a manipulator comprising a first set of receivers for receiving the set of first articles, the manipulator movable among a retracted position, a first advanced position, and a second advanced position. When in the retracted position, the manipulator is clear of the mold halves; when in the first advanced position, the first set of receivers is aligned with the set of first cavities for receiving the set of first articles; and when in the second advanced position, the first set of receivers is aligned with the set of second cavities for receiving the set of second articles in an assembled condition with the set of first articles.

Some examples may include at least one ejector for ejecting the set of second articles from the second cavities into assembled condition with the set of first articles. The manipulator may include a tooling plate mounted to an arm, and the set of first receivers may be fixed to the tooling plate.

Some examples may include a linear actuator for moving the manipulator along a linear axis between the retracted position and at least one linear advanced position. The at least one linear advanced position may correspond to at least one of the first advanced position and the second advanced position. The first and second advanced positions may be spaced apart from each other along the linear axis and correspond to distinct first and second linear advanced positions.

The injection molding machine may include a first set ejector associated with the set of first cavities for transferring the set of first articles to the first set of receivers when in the first advanced position, and a second set ejector associated with the set of second cavities for transferring the set of second articles into assembled condition with the set of first articles in first set of receivers when in the second advanced position. The tooling plate can be rotatably mounted to the arm, rotatable between first and second rotary positions, the first rotary position associated with the first advanced position, and the second rotary position associated with the second advanced position. The first and second advanced positions can have a common linear advanced position.

The manipulator can include a second set of receivers, and when in the first advanced position, the first set of receivers can be aligned with the set of first cavities and the second set of receivers can be aligned with the set of second cavities. Individual receivers of the first and second sets of receivers are identical.

The machine may include a first set ejector for ejecting the first set of molded articles from the first cavities to the first receivers when the manipulator is in the first advanced position, and a second set ejector for ejecting, in a subsequent cycle, the set of second molded articles from the second cavities into assembled engagement with the set of first molded articles in the second receivers when the manipulator is in the second advanced position.

The machine may include a dual set ejector, the dual set ejector simultaneously transferring (i) the first set of articles to the first receivers and (ii) the second set of articles into assembled relation with another set of first articles already received in the second set of receivers from a previous cycle.

The machine may include a first injection barrel to inject resin into the set of first cavities, and a second injection barrel to inject resin into the set of second cavities.

According to some aspects, an injection molding machine includes a machine base; a first platen and a second platen, the platens supported by the machine base, at least one of the platens translatable along a machine axis for opening and closing a mold defined at least in part by respective first and second mold halves mounted to the first and second platens; a mold center section between the first and second platens; and a manipulator comprising a first tooling plate rotatably mounted to a first arm and a second tooling plate rotatably mounted to a second arm, each tooling plate rotatable between first and second rotary positions, the first and second tooling plates reaching between the first and second platens on opposite sides of the mold center section when in a linearly advanced position.

The machine can include a first set of receivers and a second set of receivers affixed to the first tooling plate, wherein when in the linearly advanced position and the first rotary position, the first and second sets of receivers face and are aligned with a set of first mold cores and a set of second mold cores, respectively, provided in the first mold half, and when in the linearly advanced position and the second rotary position, the first and second sets of receivers face and are aligned with the set of second mold cores and the set of first mold cores, respectively.

The machine can include a third set of third receivers and a fourth set of fourth receivers affixed to the second tooling plate, wherein when in the linearly advanced position and the first rotary position, the third and fourth sets of receivers face and are aligned with a set of third mold cores and a set of fourth mold cores, respectively, provided in the second mold half, and when in the linearly advanced position and the second rotary position, the third and fourth sets of receivers face and are aligned with the set of fourth mold cores and the set of third mold cores, respectively.

The machine can include a first dual-set ejector mounted to the first platen for transferring a set of first articles from the first mold cores to the first set of receivers, and transferring a set of second articles from the second mold cores into assembled condition with another set of first articles in the set of second receivers.

The machine can include a second dual-set ejector mounted to the second platen for transferring a set of third articles from the third mold cores to the third set of receivers, and transferring a set of fourth articles from the fourth mold cores into assembled condition with another set of third articles in the set of fourth receivers According to some aspects, a method for injection molding includes: (a) forming a set of first articles in a mold of an injection molding machine; (b) forming a set of second articles in the mold of the injection molding machine; (c) transferring the set of first articles from the mold to a first set of receivers; (d) moving the first set of receivers to align with the set of second articles; and (e) after step d, transferring the set of second articles from the mold to the first set of receivers into assembled condition with the set of first articles.

In some examples, step d) can include linearly displacing the first set of receivers. Step a) and step b) can occur during a single machine cycle. Step c) can occur before step b), and the method can further include retracting the first set of receivers to a retracted position clear of the mold prior to step b). Step d) can include rotating a tooling plate to which the first set of receivers is affixed. During step e) another set of first articles can be transferred from the mold to a second set of receivers affixed to the tooling plate. Step c) can occur after step b).

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1 is a top plan view of a schematic representation of an example injection molding machine;

FIGS. 2 to 7 are schematic drawings, showing a portion of the injection molding machine of FIG. 1 in top plan view, sequentially showing the operational configuration of the injection molding machine;

FIGS. 9 to 13 are schematic drawings, showing a portion of the injection molding machine of FIG. 8 in top plan view, sequentially showing the operational configuration of the injection molding machine;

FIG. 17a is a front elevation view of a first mold half attached to a first mold support;

DETAILED DESCRIPTION

Figure 8:
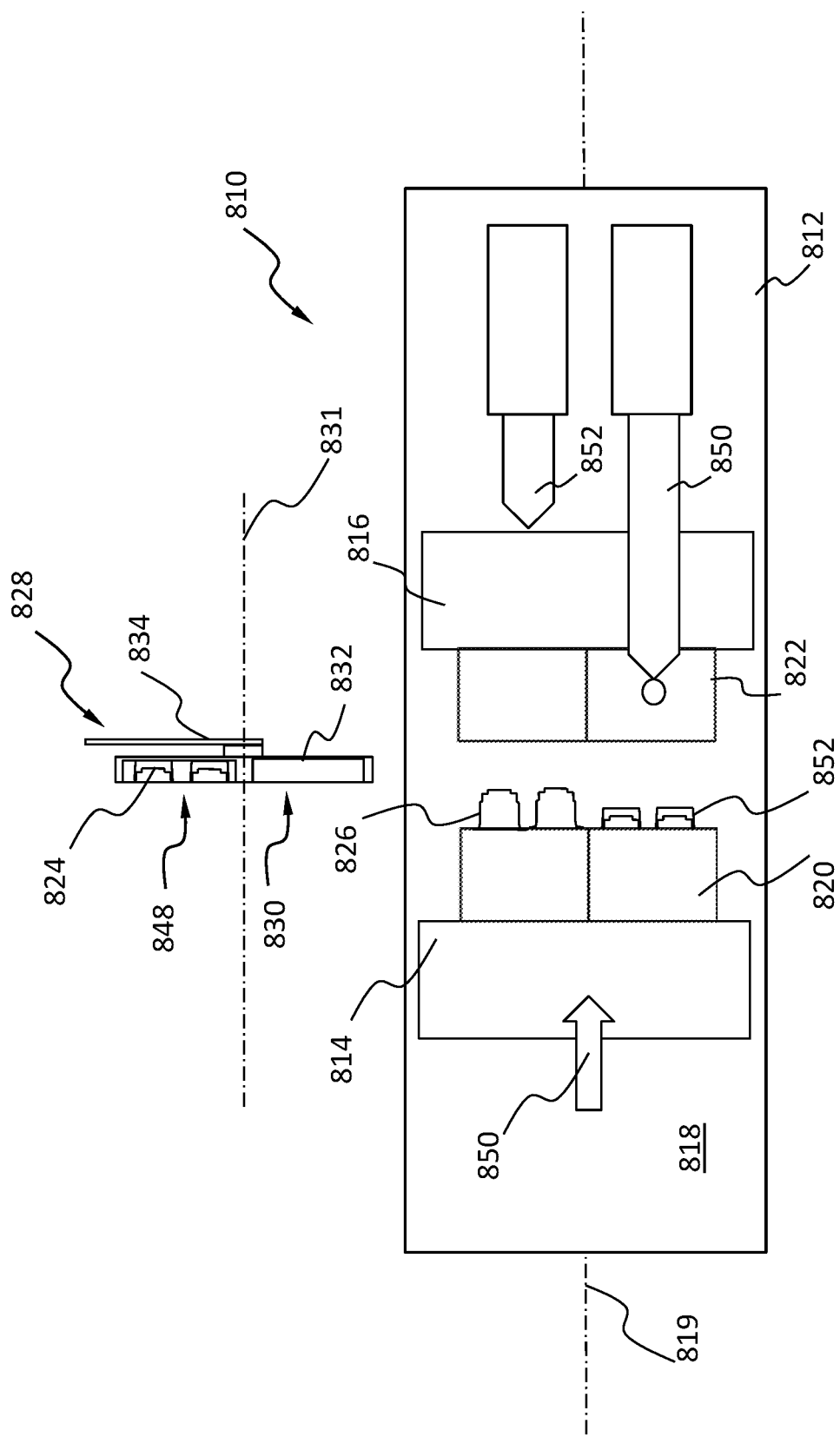
FIG. 8 is a top plan view of a schematic representation of another example injection molding machine.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Referring to FIG. 1, an example injection molding machine 110 comprises a machine base 112 for supporting an injection mold. The injection mold is formed at least in part by a first mold half 120 supported by a first mold support 114, and a second mold half 122 supported by a second mold support 116. In the example illustrated, the first mold support 114 and the second mold support 116 are configured as platens and also referred to herein as first platen 114 and second platen 116. The first and second mold halves 120, 122 define a set of first cavities for forming a set of first articles 124, and a set of second cavities for forming a set of second articles 126 (see in FIG. 3).

Referring still to FIG. 1, in the example illustrated, the machine base 112 has a top surface 118, and the platens 114, 116 are supported on the top surface 118 of the machine base 112. At least one of the platens 114, 116 is translatable along a machine axis 119 for moving the mold halves 120, 122, between a mold-open position (shown in FIG. 3) and a mold-closed position (shown in FIG. 1). In the example illustrated, the first platen 114 is translatable relative to the machine base 112 and is also referred to as moving platen 114, and the second platen 116 is stationary relative to the base 112 (when in use) and is also referred to as stationary platen 116.

The machine 110 further includes a manipulator 128. As will be described in further detail below with reference to FIGS. 2 to 7, the manipulator 128 may be configured for in-mold assembly of the set of first articles 124 to the set of second articles 126. For example, the set of first articles 124 may include a set of caps, and the set of second articles 126 may include a set of flanges (or nozzles). The set of first articles 124 and the set of second articles 126 may be assembled together in the mold by press-fitting or interference-fitting the set of caps onto the set of nozzles.

Referring still to FIG. 1, in the example shown, the manipulator 128 includes a first set of receivers 130 for receiving the set of first articles 124. The first set of receivers 130 is fixed to a tooling plate 132, which is mounted to an arm 134.

The manipulator 128 is moveable among a retracted position (shown in FIGS. 1, 2, 3, and 7), a first advanced position (shown in FIG. 4), and a second advanced position (shown in FIGS. 5 and 6). When in the retracted position, the manipulator 128 is clear of the mold halves 120, 122. When in the first advanced position, the first set of receivers 130 is aligned with the set of first cavities for receiving the set of first articles 124. When in the second advanced position, the first set of receivers 130 is aligned with the set of second cavities, for receiving the set of second articles 126 in an assembled condition with the set of first articles 124.

The injection molding machine 110 may further include an actuator 129 for moving the manipulator 128 between the retracted position, and at least one of the first advanced position and the second advanced position. In the example shown, with reference to FIGS. 3, 4, and 5 the first and second advanced positions are linearly spaced apart from each other, and the actuator 129 (also called a linear actuator 129 in this example) comprises a motor and linear guide to move the manipulator 128 between the retracted position and the first advanced position, the first advanced position and the second advanced position, and between the second advanced position and the retracted position.

Referring still to FIG. 1, the injection molding machine 110 further includes at least one ejector for ejecting the set of first articles from the first mold cavities. In the example illustrated, the machine 110 includes a first set ejector 136 associated with the set of first cavities for transferring the set of first articles 124 to the first set of receivers 130, and a second set ejector 138 associated with the set of second cavities for transferring the second set of articles 126 into assembled condition with the first set of articles 124 in first set of receivers 130.

Referring still to FIG. 1, the injection molding machine further includes a first injection barrel 140 for injecting resin into the set of first cavities to form the set of first articles, and a second injection barrel 142 for injecting resin into the set of second cavities to form the set of second articles 126. Having separate injection barrels can facilitate providing different material properties for the first articles 124 as compared to the second articles 126. In some examples, a single injection barrel can inject resin into both the first cavities and second cavities of the mold.

Referring now to FIGS. 2 to 7, an example of the operation of the machine 110, and particularly of the in-mold assembly of the manipulator 128, will be described.

Referring to FIG. 2, when the mold is in the mold-closed position, resin may be injected into the mold simultaneously from the first injection barrel 140 and the second injection barrel 142, in order to form the set of first articles 124 and the set of second articles 126. During injection, the manipulator 128 is in the retracted position.

Referring to FIG. 3, upon completion of injection, the mold may be opened. Referring to FIG. 4, upon opening of the mold, the manipulator 128 may be moved to the first advanced position by the axial actuator 129, so that the first set of receivers 130 is aligned with the set of first cavities. The first set ejector 136 may then be actuated, to transfer the set of first articles 124 to the first set of receivers 130.

Referring to FIG. 5, the manipulator 128 may then be moved to the second advanced position by the linear actuator, so that the first set of receivers 130 is aligned with the set of second cavities. Referring to FIG. 6, the second set ejector 138 may then be actuated, to transfer the set of second articles 126 towards the first set of receivers 130, and particularly, into assembled condition with the set of first articles 124 in the first set of receivers 130. For example, as mentioned above, the second set of articles 126 may be press-fit or interference-fit to the first set of articles 124. The assembly of the first articles 124 with the second articles 126 provides assembled articles 144.

Referring to FIG. 7, the manipulator 128 may then be moved to the retracted position, and the assembled articles 144 may be unloaded from the manipulator 128 and transferred to, for example, a conveyer 146. When the manipulator 128 is moved to the retracted position, the mold may be moved to the mold-closed position, and the cycle shown in FIGS. 2 to 7 may begin again.

Referring now to FIG. 8, another example injection molding machine 810 is shown, having similarities to the machine 110 and in which like features are identified by like reference characters, incremented by 700.

In the injection molding machine 810, the manipulator 828 includes a second set of receivers 848 fixed to the tooling plate 832 in addition to the first set of receivers 830. In the example illustrated, the second set of receivers 848 is positioned adjacent the first set of receivers 830, so that when the first set of receivers 830 is aligned with the first set of cavities, the set of second receivers is aligned with the set of second cavities, as can be seen in FIG. 10. In the example shown, individual receivers of the first and second sets 830, 848 are identical.

Figure 13:
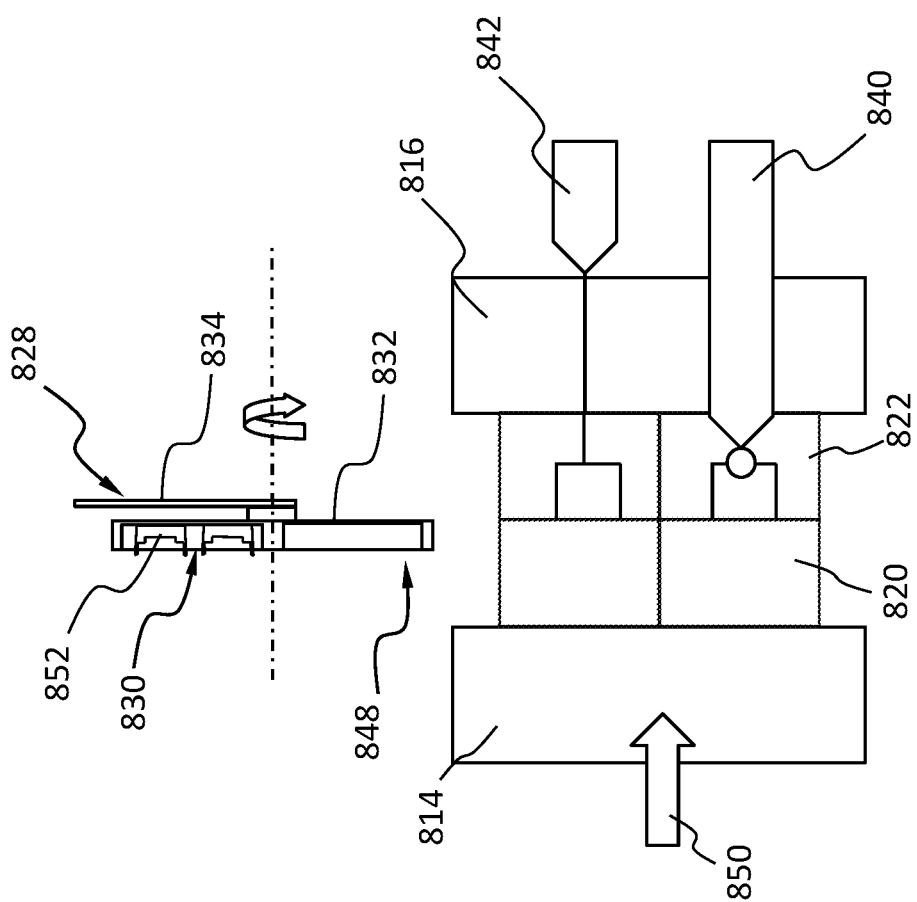

The tooling plate 832 of the manipulator 828 is rotatably mounted to the arm 834 about a rotation axis 831, and is rotatable between a first rotary position (shown in FIG. 11) and a second rotary position (shown in FIG. 13). The first rotary position is associated with the first advanced position of the manipulator 828, and the second rotated position is associated with the second advanced position of the manipulator 828. Particularly, the manipulator 828 first advanced position corresponds to a position in which the tooling plate 832 is in the first rotary position, and the manipulator arm 834 is linearly advanced, so that the first set of receivers 830 is aligned with the set of first cavities, and the set of second receivers 848 is aligned with the set of second cavities, as shown in FIG. 10. The manipulator second advanced position corresponds to a position in which the tooling plate 832 is in the second rotary position, and the manipulator arm is linearly advanced, so that the second set of receivers 848 is aligned with the set of first cavities, and the first set of receivers 830 is aligned with the set of second cavities (i.e. as shown in FIG. 10, but with the positions of the receiver sets 830 and 848 reversed). The arm 834 has a common linearly advanced position (arm advanced position) when the manipulator 828 is in the first advanced position and the second advanced position.

Referring still to FIG. 8, the injection molding machine 810 includes a dual set ejector 850. As will be described in further detail below with respect to FIGS. 9 to 13, the dual set ejector 850 transfers the set of first articles 824 from the first mold cavities to the first set of receivers 830, and simultaneously transfers the set of second articles from the second mold cavities into assembled relation with another set of first articles 824, already loaded in the second set of receivers 848, from the previous machine cycle.

Referring now to FIGS. 9 to 13, an example of the operation of the machine 810, and particularly of the in-mold assembly of the manipulator 828, will be described.

Referring to FIG. 9, the manipulator 828 is shown in the linearly retracted position, with the tooling plate 832 in the first rotary position, and with one set of first articles 824, formed in a previous injection cycle, received in the second set of receivers 848. Further, the mold is shown upon the completion of injection of resin into the mold halves, to form another set of articles 824, and a set of second articles 826.

Referring to FIG. 10, when the mold has been moved to the mold-open position, the manipulator 828 may be moved to the first advanced position, by linearly advancing the manipulator 828 so that the first and second set of receivers 830, 848 are between the mold halves, and more particularly, so that the first set of receivers 830 is aligned with the set of first cavities, and the second set of receivers 848 is aligned with the set of second cavities. The dual set ejector 850 may then be actuated to transfer the set of second articles 826 towards the second set of receivers 848 in assembled configuration with a previous set of first articles 824 (for example by press-fit or interference fit), and to simultaneously transfer the current set of first articles 824 to the first set of receivers 830.

Figure 12:
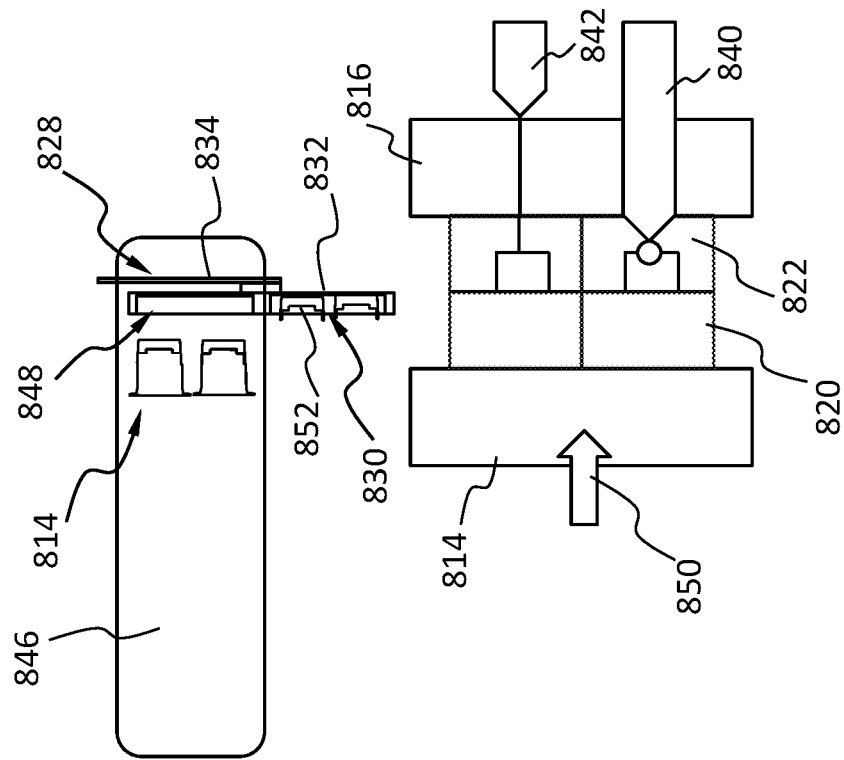
Figure 11:
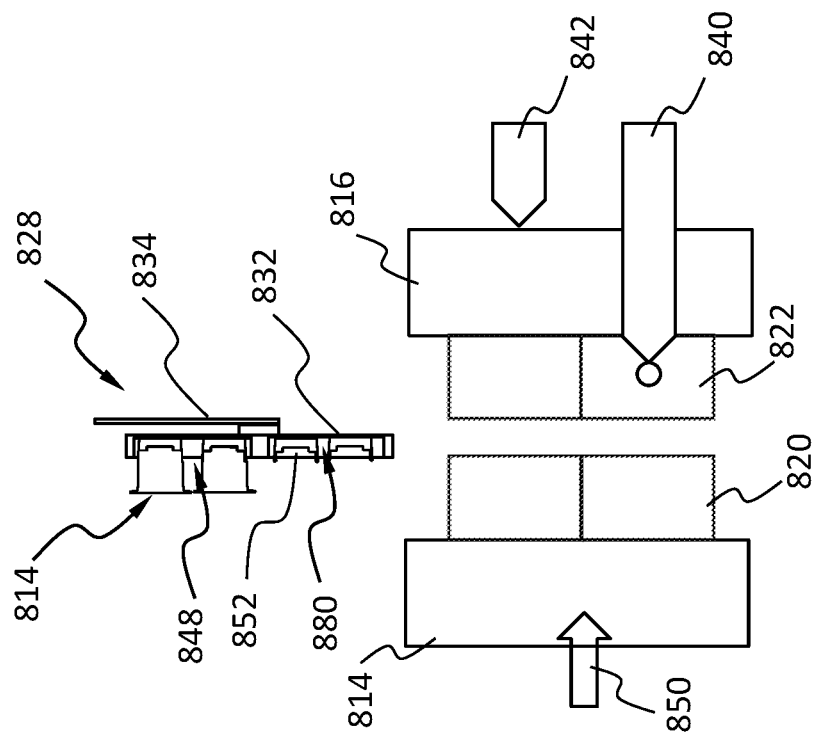

Referring to FIG. 11, the manipulator 828 may then be moved to the retracted position. Referring to FIG. 12, when the manipulator 828 is moved to the retracted position, the mold may be moved to the mold-closed position, and injection of resin may begin again. The assembled articles 844 in the second set of receivers 848 may be unloaded from the manipulator 828 and transferred, for example, to a conveyer 846, while retaining the other first set of articles 824 in the first set of receivers 830.

Referring to FIG. 13, the tooling plate 832 may then be rotated to the second rotary position. Upon completion of injection of the resin, the mold may be moved to the mold-open position, and the cycle may begin again, this time beginning with the tooling plate 832 in the second rotary position, and by linearly advancing the manipulator to reach the second advanced position.

Figure 14:
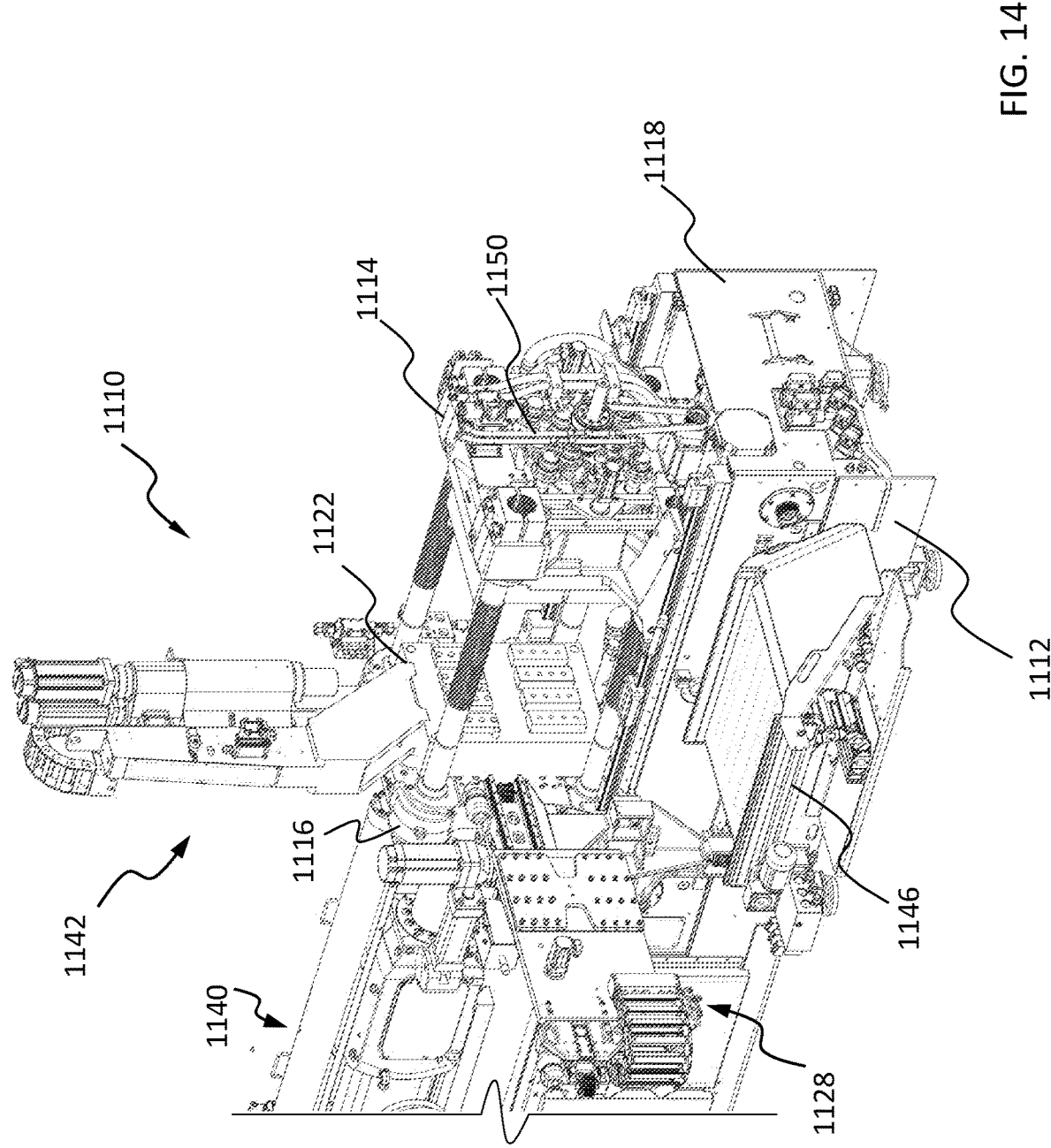
FIG. 14 is a perspective view of a portion of another example of an injection molding machine.

Referring now to FIG. 14, another example of an injection molding machine 1110 is shown. The injection molding machine 1110 is similar to the machine 810, and like features are identified by like reference characters, incremented by 300.

Figure 17:
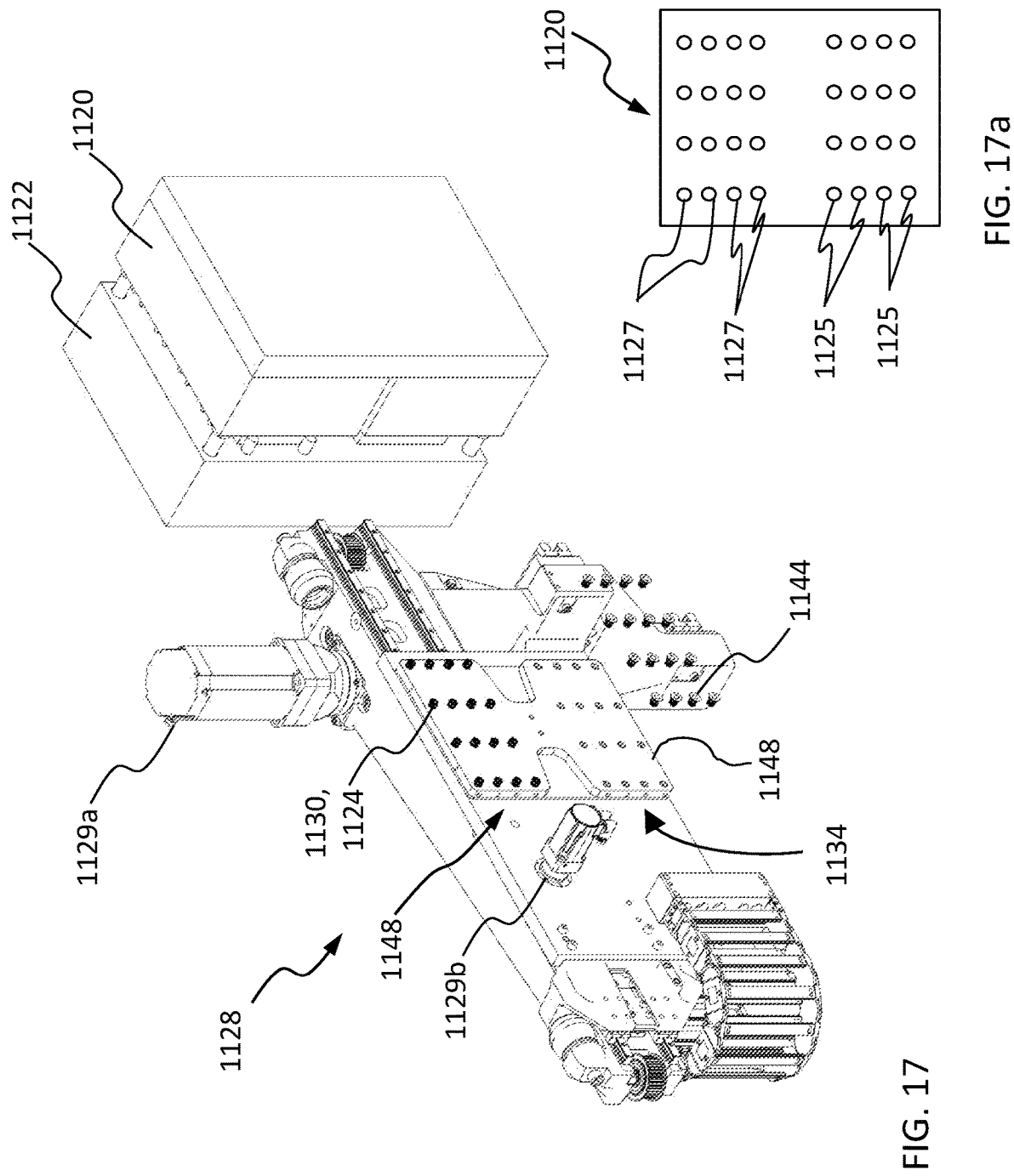
FIG. 17 is a view similar to that of FIG. 15, showing the manipulator in a retracted linear position and a first rotated position.

In the injection molding machine 1110, the first mold half 1120 and second mold half 1122 define a set of first cavities for forming a set of first articles 1124, and a set of second cavities for forming a set of second articles 1126. Referring to FIG. 17, in the example illustrated, upon opening the mold after forming the first and second articles, the first articles 1124 are retained on first mold cores 1125 in the first mold half 1120, and the second articles 1126 are retained on second mold cores 1127 in the first mold half 1120. In the example illustrated, the mold cores are arranged in sets, and each set comprises 16 mold cores arranged in a 4×4 matrix, with the set of second mold cores 1127 disposed adjacent to, and vertically above, the set of first mold cores 1125.

Figure 15:
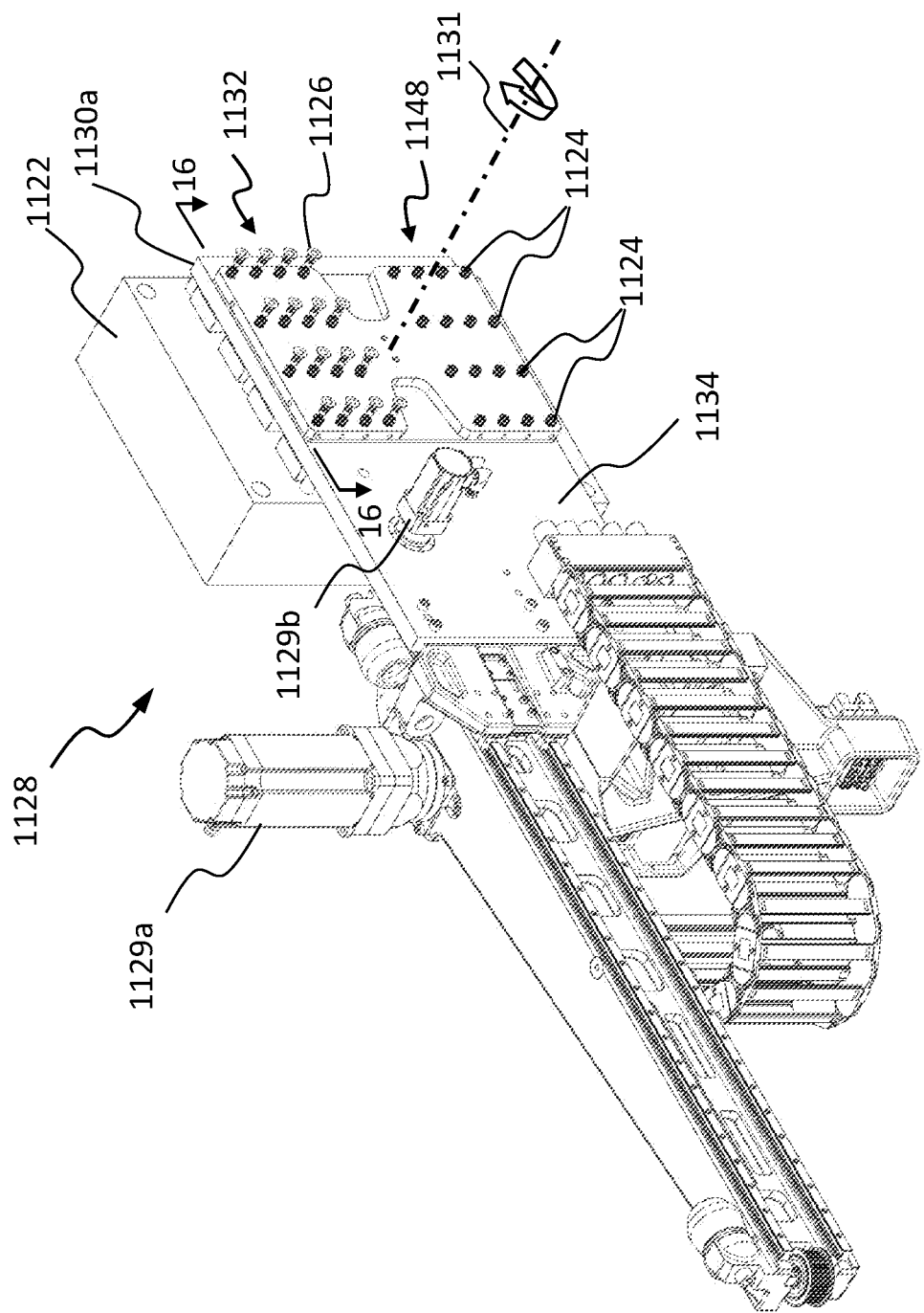
FIG. 15 is an enlarged view of a portion of the machine of FIG. 14, including a manipulator shown in a second advanced position.

Referring again to FIG. 15, the manipulator 1128 includes second receivers arranged to form a second receiver set 1148. The second set of receivers 1148 is positioned relative to the first set of receivers 1130, so that when the first set of receivers 1130 is aligned with the first set of cavities (i.e. with the first set of mold cores 1125), the second set of receivers 1148 is aligned with the second set of cavities (i.e. with the second set of mold cores 1127).

In the example shown, the individual receivers in the first and second sets 1130, 1148 are identical. When the machine is in normal operation, the two sets of receivers alternate from cycle to cycle between alignment with the first cavities and alignment with the second cavities. After each cycle both sets of receivers will hold a respective first set of molded articles, but when leaving the machine, the set aligned with the second mold cores 1127 will exit from the mold area with the second molded articles 1126 assembled with the first articles 1124 retained in the receivers serving as the second set.

The tooling plate 1132 of the manipulator 1128 is rotatably mounted to the arm 1134 about a rotation axis 1131 that is, in the example illustrated, oriented horizontally and parallel to the machine axis 1119. The tooling plate 1132 is rotatable between a first rotary position (shown in FIG. 17) and a second rotary position (shown in FIG. 15). The first rotary position is associated with the first advanced position of the manipulator, and the second rotary position is associated with the second advanced position of the manipulator. Rotation of the manipulator is, in the example illustrated, effected by a rotary actuator 1129b.

The manipulator first advanced position corresponds to a position in which the tooling plate 1132 is in the first rotary position, and the manipulator arm 1134 (with tooling plate 1132) is advanced linearly (e.g. by linear actuator 1129a), so that the first set of receivers 1130 is aligned with the set of first cavities, and the second set of receivers 1148 is aligned with the set of second cavities.

The manipulator second advanced position (FIG. 15) corresponds to a position in which the tooling plate 1132 is in the second rotated position, and the manipulator arm is axially advanced, so that the second set receivers 1148 are aligned with the first set of cavities, and the first set receivers 830 are aligned with the second set of cavities. The arm 834 has a common axially advanced position when in the first advanced position and the second advanced position.

Figure 16:
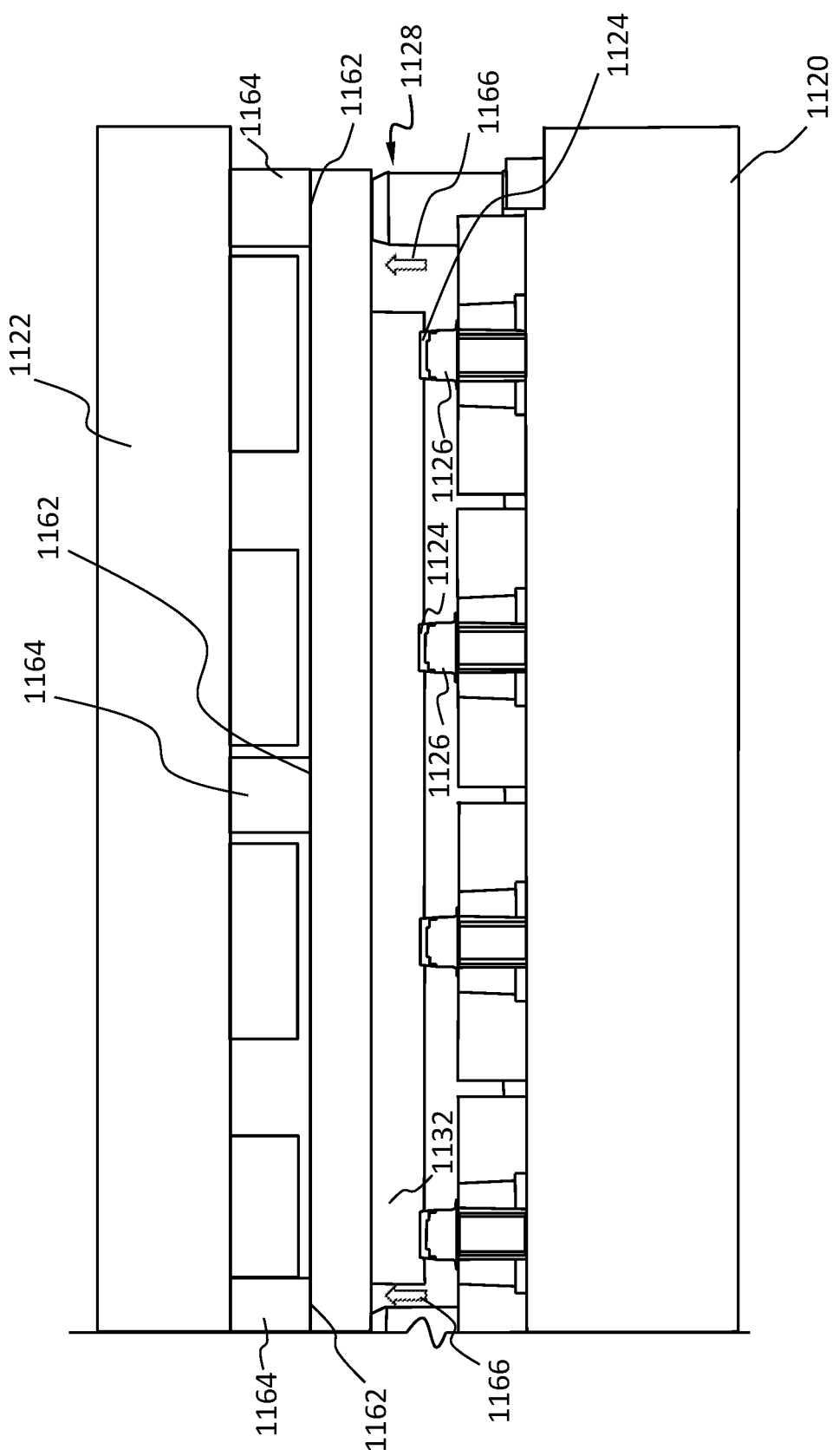
FIG. 16 is a section view of a portion of the structure of FIG. 15, taken along the lines 16-16.

Referring to FIG. 16, the manipulator can include assembly load bearing members to help resist deflection of the tooling plate 1132 during assembly of the second articles 1126 onto the first articles 1124. In the example illustrated, the manipulator includes abutment surfaces 1162 on a back face of the arm, directed towards the stationary platen 1122. The stationary platen can include stoppers 1164 spaced axially apart by a small clearance gap from the abutment surfaces when the manipulator is in the axially advanced position. The abutment surfaces can engage the stop surfaces in response to an axial load (identified at arrows 1166) exerted by assembly of the second articles with the first articles.

Figure 18:
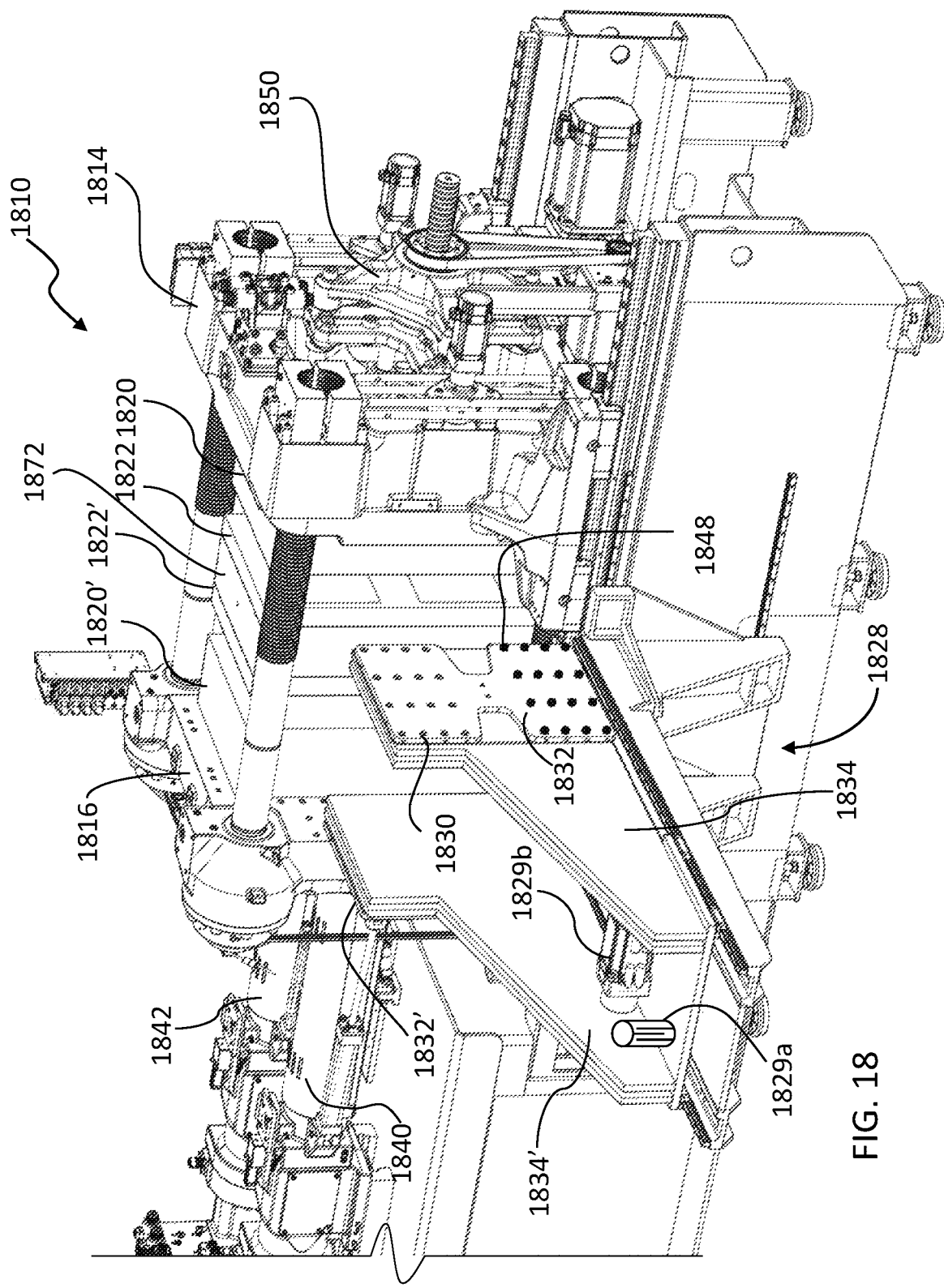
FIG. 18 is a perspective view of another example of an injection molding machine with tooling plates mounted to the manipulator and shown in a retracted linear position.

Referring now to FIG. 18, another example of an injection molding machine 1810 is shown. The injection molding machine 1810 is similar to the machine 1110, and like features are identified by like reference characters, incremented by 700.

The injection molding machine 1810 includes a plurality of axially spaced-apart mold supports mounted on the machine base 1812. In the example illustrated, the mold supports are provided by a mold center section 1872 and a pair of platens between which the mold center section is disposed.

A first one of the platens provides a first mold support for supporting a first mold half 1820. A first side of the mold center section 1872 provides a second mold support for supporting a second mold half 1822 facing the first mold half 1820.

The second platen provides a third mold support for supporting a third mold half 1820' facing the mold center section 1872, and a second side of the mold center section, opposite the first side, provides a fourth mold support for supporting a fourth mold half 1822'.

The first mold half 1820 and second mold half 1822 define a set of first cavities for forming a set of first articles 1824, and a second set of cavities for forming a second set of articles 1826. The third mold half 1820' and fourth mold half 1822' define a third set of cavities for forming a third set of articles 1824', and a fourth set of cavities for forming a fourth set of articles 1826'. In the example illustrated, the third set of articles 1824' are identical to the first set of articles 1824, and the fourth set of articles 1826' are identical to the second of articles 1826.

The injection molding machine 1810 includes a manipulator 1828 with two tooling plates: a first tooling plate 1832 and a second tooling plate 1832'. Each tooling plate is, in the example illustrated, rotatably mounted to a respective arm 1834, 1834' fixed to the manipulator. When the manipulator moves linearly to a linear advanced position, the first tooling plate reaches between the first and second mold supports, and the second tooling plate reaches between the third and fourth mold supports.

The first tooling plate 1832 operates in substantially the same manner as the tooling plate 1132, and the second tooling plate 1832' operates substantially in mirror image to the first tooling plate 1832.

Figure 18A:
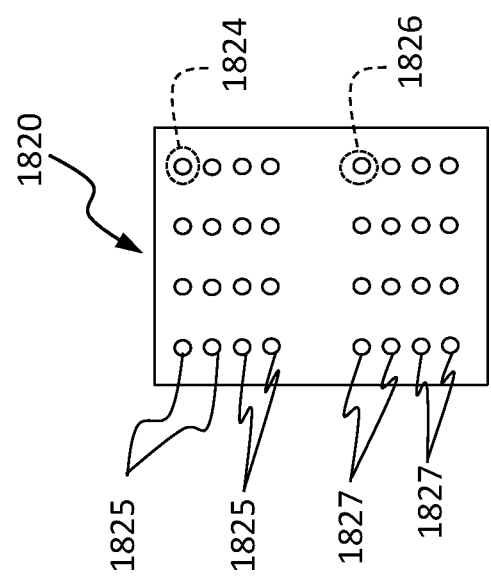
FIG. 18a is a front elevation view of a mold half mounted to a mold support of the machine of FIG. 18.

Referring also to FIG. 18*a*, in the example illustrated, upon opening the mold after an injection cycle, the first articles 1824 are retained on first mold cores 1825 in the first platen 1820, and the second articles 1826 are retained on second mold cores 1127 in the first platen 1820. In the example illustrated, each set comprises 16 mold cores arranged in a 4×4 matrix, with the set of second mold cores 1827 disposed adjacent to, and vertically below, the set of first mold cores 1825. Other configurations are also possible, for example, a configuration in which the first mold cores of the first mold core set are interlaced column-by-column, row-by-row, or individually, with second mold cores of the second mold core set.

Referring again to FIG. 18, the first tooling plate 1832 of the manipulator 1828 includes a first receiver set of first receivers 1830 and second receiver set of second receivers 1848. The first and second receivers are spaced apart relative to each other so that when one set of receivers is aligned with the set of first cavities (i.e. with the set of first mold cores 1825), the other set of receivers is aligned with the set of second cavities (i.e. with the set of second mold cores 1827).

In the example shown, the set of first receivers 1830 and the set of second receivers 1848 are both configured to hold and retain respective ones of the first articles 1824. When the machine is in normal operation, the two sets of receivers alternate from cycle to cycle between holding a first article set 1824 when withdrawing from the mold area, and holding an assembled article set 1844 when withdrawing from the mold area.

Figure 21:
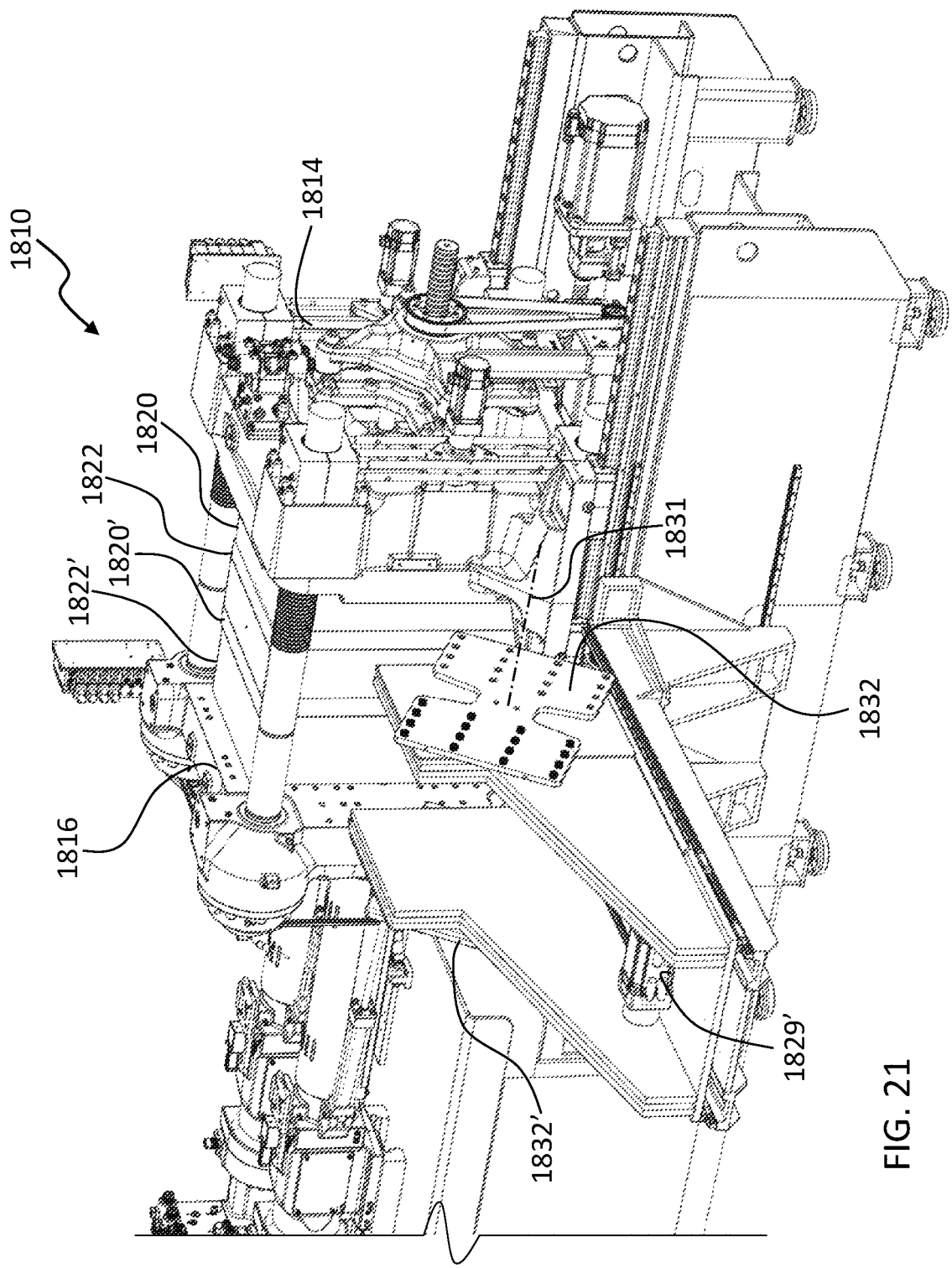
FIG. 21 is similar to FIG. 20, showing the tooling plates moving to a second rotary position.
Figure 22:
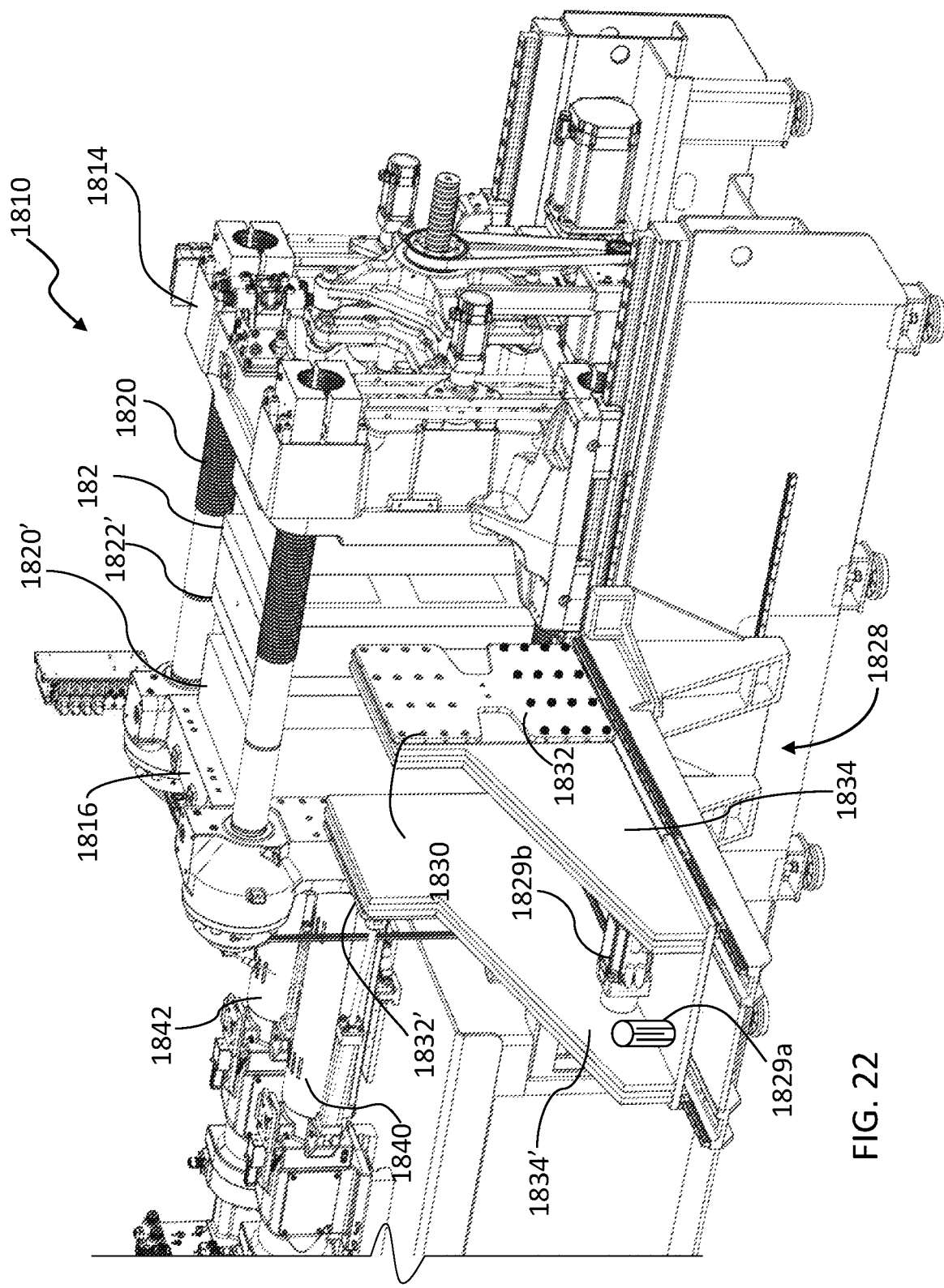
FIG. 22 is similar to FIG. 21, showing the tooling plates in the second rotary position.

The first tooling plate 1832 of the manipulator 1828 is rotatably mounted to the arm 1834 about a rotary axis 1831 (FIG. 21), and is rotatable between a first rotary position (shown in FIG. 18) and a second rotary position (shown in FIG. 22). The first rotary position is associated with the first advanced position of the first tooling plate, and the second rotary position is associated with the second advanced position of the first tooling plate 1832. Rotation of the first tooling plate 1832 is, in the example illustrated, effected by a rotary actuator 1829*b*.

Figure 19:
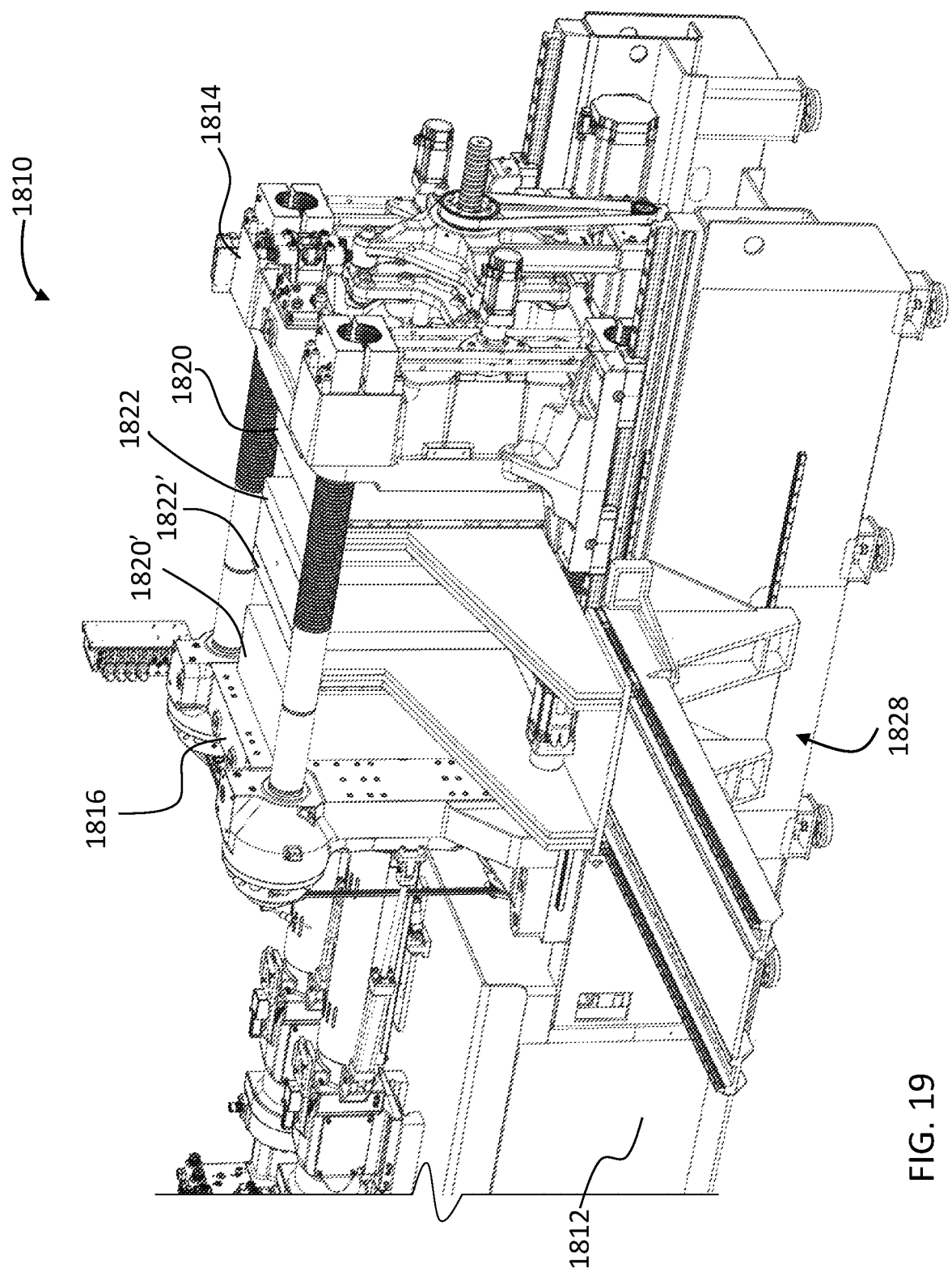
FIG. 19 is similar to FIG. 18, showing the manipulator in an advanced position upon entry into the mold area.
Figure 20:
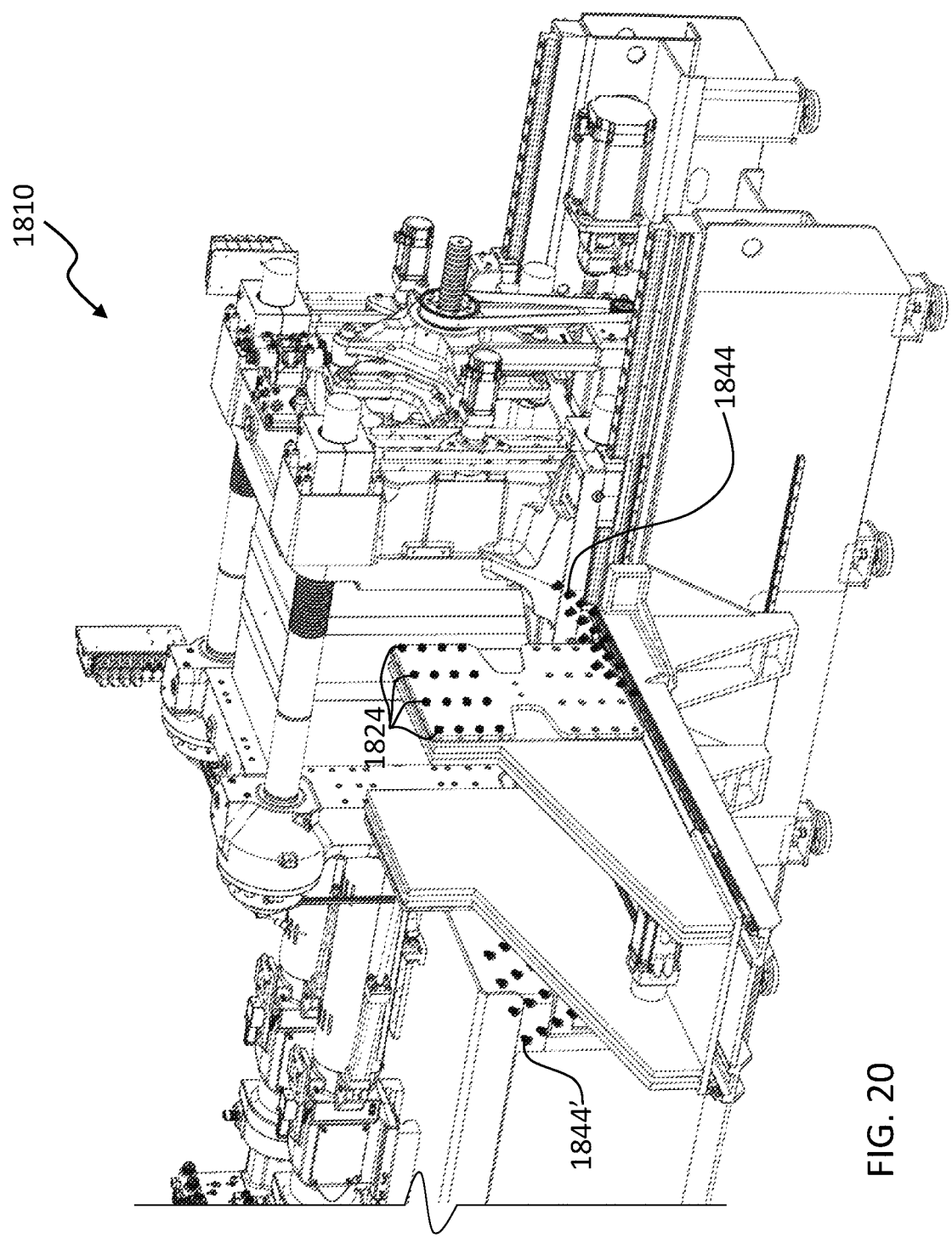
FIG. 20 is similar to FIG. 19, showing the manipulator retracted from the mold area and the mold closed.

The first advanced position of the first tooling plate 1832 corresponds to a position in which the tooling plate 1832 is in the first rotary position (FIG. 18), and the first arm 1834 is linearly advanced (FIG. 19). Linear motion can include urging the arm to slide along a carrier 1835 by a linear actuator 1129*a*, so that the first set of receivers 1130 is aligned with the set of first cavities (first mold cores 1825), and the second set of receivers 1148 is aligned with the second set of cavities (second mold cores 1827).

The second advanced position of the first tooling plate 1832 corresponds to a position in which the tooling plate 1832 is in the second rotary position (FIG. 22), and the manipulator arm is linearly advanced, so that the second set receivers 1148 are aligned with the set of first cavities, and the first set receivers 1830 are aligned with the set of second cavities. The first arm 1834 has a common linearly advanced position when the first tooling plate is in the first advanced position and the second advanced position.

When in the first advanced position, a first dual-set ejector 150 transfers a set of first articles from the first mold half 1820 to the first receivers of the first plate 1832, and transfers a set of second articles into assembled condition with another set of first articles retained in the second the second receivers of the first plate. A second dual-set ejector performs the corresponding operation with respect to third and fourth articles ejected from the third mold half. When in the second advanced position, the same function is performed but with the plates 1832, 1832' rotated in the second rotary position.

In the examples described above, the sets of cavities, sets of articles, and sets of receivers include multiple cavities, articles, and receivers, respectively. In alternate examples, each set of cavities, articles, and receivers may include only one cavity, article, and receiver, respectively.

While the above description provides examples of one or more processes or apparatuses, it will be appreciated that other processes or apparatuses may be within the scope of the accompanying claims.

The invention claimed is:

1. A method for injection molding comprising:
   a) forming a set of first articles in a mold of an injection molding machine;
   b) forming a set of second articles separate from the set of first articles in the mold of the injection molding machine;
   c) transferring the set of first articles from the mold to a first set of first receivers;
   d) moving the first set of first receivers to align with the set of second articles; and
   e) after step d), transferring the set of second articles from the mold toward the first set of first receivers and into assembled condition with the set of first articles held in the first set of first receivers.

2. The method of claim 1, wherein step d) comprises linearly displacing the first set of first receivers in a direction parallel to a mold-opening direction of the mold.

3. The method of claim 2, wherein step a) and step b) occur during a single machine cycle.

4. The method of claim 1, wherein step c) occurs before step b), and the method further comprises retracting the first set of first receivers to a retracted position clear of the mold prior to step b).

5. The method of claim 4, wherein step d) comprises rotating a tooling plate to which the first set of first receivers is affixed.

6. The method of claim 1, wherein during step e) another set of first articles is transferred from the mold to a second set of second receivers affixed to the tooling plate.

7. The method of claim 1, wherein step c) occurs after step b).

8. A method for producing assembled injection molded articles, comprising:
 a) forming a set of first articles in respective first mold cavities of a mold of an injection molding machine;
 b) forming a set of second articles separate from the set of first articles in respective second mold cavities of the mold of the injection molding machine;
 c) opening the mold by translating at least a first mold half away from a second mold half along a machine axis;
 d) advancing a tooling plate toward the machine axis to align a first set of first receivers of the tooling plate with the first mold cavities;
 e) after step (d), transferring the set of first articles from the first mold cavities to the first set of first receivers;
 f) after step (e), moving the tooling plate to align the first set of first receivers with the second mold cavities; and
 g) after step (f), transferring the set of second articles from the second mold cavities toward, and into assembled condition with, the set of first articles held in the first set of first receivers.

9. The method of claim 8, wherein step (a) comprises injecting a first resin into the first mold cavities from a first injection barrel, and step (b) comprises injecting a second resin into the second mold cavities from a second injection barrel.

10. The method of claim 8, wherein step (e) comprises translating the set of first articles in a direction parallel to the machine axis.

11. The method of claim 10, wherein step (e) comprises advancing an ejector to push the set of first articles from the first mold cavities toward the first set of first receivers.

12. The method of claim 10, wherein step (g) comprises translating the set of second articles in a direction parallel to the machine axis.

13. The method of claim 12, wherein step (g) comprises advancing an ejector to push the set of second articles from the second mold cavities toward the first set of first receivers of the tooling plate.

14. The method of claim 12, wherein step (a) occurs during a first machine cycle, step (d) occurs after step (a), step (b) occurs during a second machine cycle after step (d), and step (g) occurs after step (d).

15. The method of claim 14, wherein an other set of first articles is formed during step (b), the other set of first articles transferred during step (g) from the first mold cavities to a second set of first receivers affixed to the tooling plate.

16. The method of claim 15, wherein step (g) comprises advancing an ejector to eject the set of second articles from the second mold cavities into assembled condition with the set of first articles held in the first set of first receivers of the tooling plate, and to simultaneously eject the other set of first articles from the first mold cavities to the second set of first receivers affixed to the tooling plate.

17. The method of claim 8, further comprising during step (g), engaging an abutment surface fixed to the tooling plate with stoppers fixed relative to the mold to resist deflection of the tooling plate during ejection of the second articles from the second cavities toward and into assembled condition with the first articles held in the first set of first receivers of the tooling plate.

\* \* \* \* \*